United States Patent Office 3,849,350
Patented Nov. 19, 1974

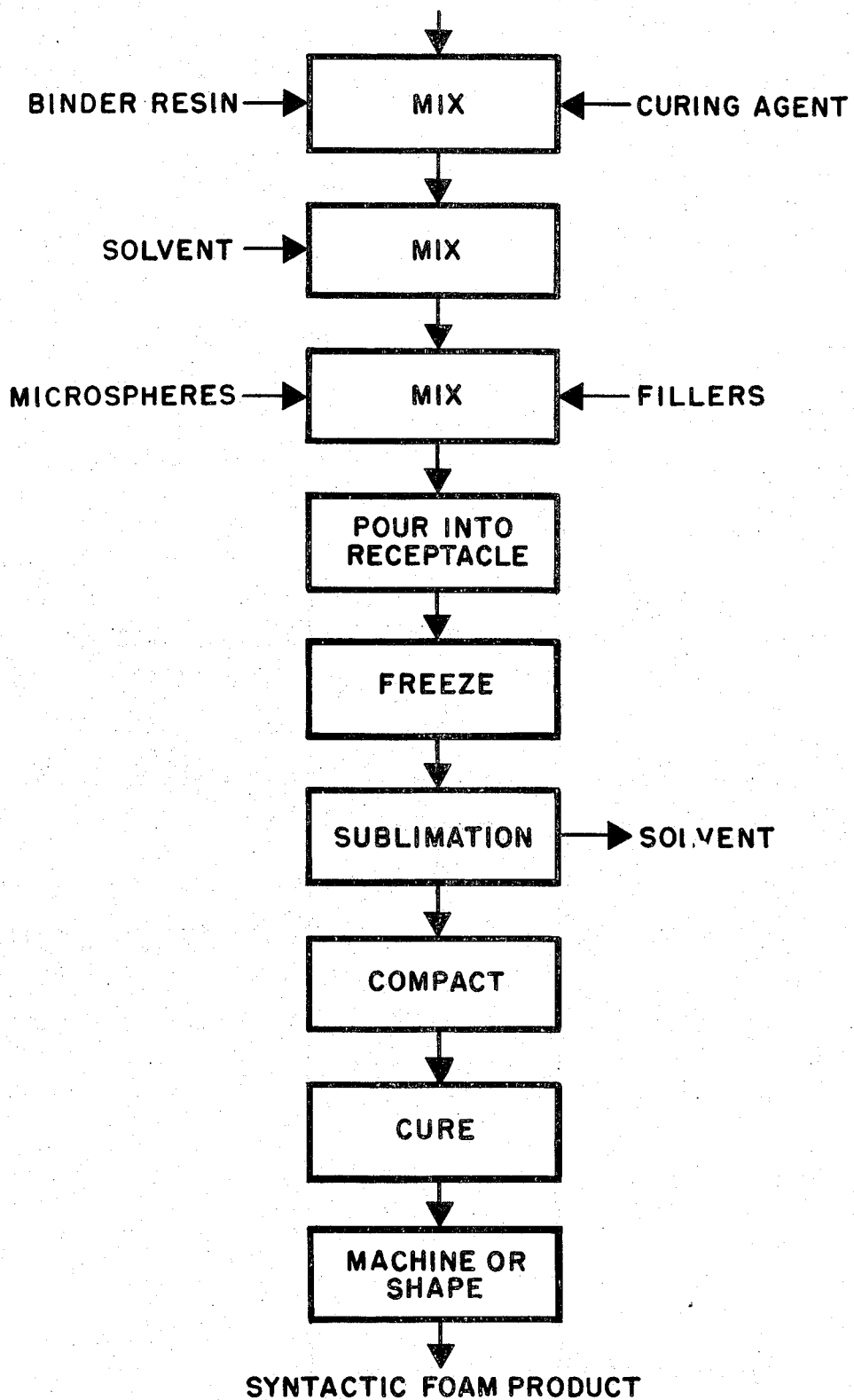

3,849,350
PROCESS OF MAKING LOW DENSITY SYNTACTIC FOAMS
John Matsko, Albuquerque, N. Mex., assignor to the United States of America as represented by the United States Atomic Energy Commission
Filed June 6, 1973, Ser. No. 367,680
Int. Cl. C08g 53/08; C08j 1/14
U.S. Cl. 260—2.5 B     9 Claims

ABSTRACT OF THE DISCLOSURE

Low binder content syntactic foams may be produced by mixing a binder resin, a flexibilizer resin and a curing agent, adding a solvent while stirring and thereafter adding hollow sphere or microsphere material, freezing the resultant mixture, subliming the solvent under evacuation until a dry product is formed, and compacting and curing the dry product to yield a low binder content and low density syntactic foam.

BACKGROUND OF INVENTION

This invention relates to low binder content syntactic foams and the method of producing same.

Present methods used to prepare low binder content cyntactic foams may involve the use of a solvent as a mixing vehicle to mix the resin binder, curing agent and hollow microsphere or bubble material. Once these have been mixed and cast, an oven drying process removes the solvent from the cast part. Oven drying to remove the solvent has a disadvantage in that filler materials, binders, and materials such as glass hollow microspheres may be separated due to density variations during the drying process. The use of the word "microspheres" herein is general and encompasses non-spherical bubbles or generally non-spherical material. If insufficient amounts of solvents are used in order to bypass the above problem, it then becomes difficult to mix the liquid and solids uniformly without rupturing the hollow glass microspheres. Therefore, in order to obtain the desired ratio of solvent and solid material, more binder material is required than would be necessary or desirable in order to yield a low binder content syntactic foam. In general, prior art syntactic foams have contained from about 60% to 65% by volume of glass miscrospheres mixed with from about 35 to about 40% of resin to produce a foam having a density of from about 0.62 to about 0.68 grams per cubic centimeter (g./cc.$^3$).

SUMMARY OF INVENTION

In view of the above described limitations and drawbacks in prior art processes, it is an object of this invention to provide a method of forming a low binder content and low density syntactic foam.

It is a further object of this invention to provide a low binder content syntactic foam by using a freeze drying process.

It is a further object of this invention to provide a low binder content syntactic foam product having a glass microsphere content of from about 90 to about 95 weight percent (w/o) and a binder content of from about 10 to about 5 weight percent.

It is a further object of this invention to provide a low binder content syntactic foam product having flame retardant and suppressant properties.

Various other objects and advantages will become apparent from the following description of this invention, and the most novel features will be pointed out with particularity hereinafter in connection with the appended claims. It is understood that various changes in the details, materials and process steps which are herein described and illustrated to better explain the nature of the invention may be made by those skilled in the art without departing from the scope of this invention.

The invention comprises, in brief, forming a mixture of binder resin, flexibilizer resin, and curing agent, adding a solvent while stirring said mixture, thereafter adding while further stirring hollow microspheres or the like, pouring the resultant mixture into a receptacle to a depth not greater than ½ inch, freezing the resultant mixture, subliming the solvent from the mixture yielding thereby a dry product, compacting the dry product and curing same to a syntactic foam, and thereafter shaping or otherwise machining into a low binder content syntactic foam product.

DESCRIPTION OF DRAWING

The drawing illustrates in a flow diagram, a process suitable for using this invention.

DETAILED DESCRIPTION

As shown in the drawing, a suitable binder resin, flexibilizer resin, and a curing agent are mixed initially. Thereafter a suitable solvent is slowly added, with agitation, to the mixture yielding thereby a highly fluid state. Glass hollow microspheres or microspheres made of tiny hollow spheres of resins such as polystyrene, and, if desired, other suitable filler materials such as a flame retardant powder or granules such as sodium bicarbonate or potassium bicarbonate together with urea are then added to the fluid mixture while stirring and this mixture, which has the microspheres and other filler materials uniformly dispersed in the resin binder materials and solvent, is poured into a suitable precooled receptacle to a depth of not greater than ½ inch and preferably from about ¼ inch to about ½ inch. The receptacle containing the mixture is placed in a suitably precooled sublimator chamber or the like and the material frozen solid. The degree of cooling to achieve the frozen state will be dependent upon the type of binder material used, the type of solvent, etc. Freezing of the slurry which has been poured into the receptacle should take place in less than about one minute in order to eliminate or substantially reduce the possibility of separation of the solid from the resin and solvent. Cooling of the frozen material to a point much lower than its freezing temperature may be unnecessary and is poor practice economically.

The solvent in the frozen material is then sublimed. The rate of sublimation is determined by a vapor pressure differential between the frozen material and condenser. In general, a process for sublimation will be determined by the particular type and size of the sublimation chamber, amount of material freeze dried, solvent in the frozen material, etc. A high initial differential pressure increases initial sublimation rate. Sublimation is accomplished as a result of the differential pressure and also as a result of evacuation of the sublimation chamber using appropriate means such as a vacuum pump. The frozen material is heated at a rate sufficient so that an efficient sublimation rate is maintained and yet the frozen material is not liquified. Sublimation is continued until the frozen material is dry as determined by such as the following indicators:

1. Condenser temperature approaches a maximum low.
2. The tray temperature rises and remains at a predetermined point.
3. The vacuum pressure in the chamber approaches a maximum low.
4. Appearance of the frozen material, etc.

When dryness is achieved, the drying cycle may be continued for a few hours such as from about 2 to about 8 hours to insure total dryness. The dried material may then be passed and cured or, if these steps are not to be performed relatively soon, the freeze dried material may be maintained dry by maintaining refrigerated at about 40°

F. until ready for pressing in order to prevent curing of the constituents.

The freeze-dried material may then be placed in a mold and compressed to a pressure of from about 90 to about 200 pounds per square inch and preferably from about 120 to about 140 pounds per square inch. After pressing, the pressed part may be removed from the mold and cured by placing in such as a forced air drying oven and maintaining at a suitable temperature for a sufficient length of time to assure curing. The curing time and temperature will be dependent upon the kind and quanity of resins and curing agent used. After curing, the syntactic foam may be shaped or machined to a desired configuration yielding a syntactic foam product. Machining may be performed using standard machining procedures.

The advantages of this process over prior art processes are such as:

1. Quick freezing of the slurry prevents segregation of the slurry components.
2. Sublimation of the solvent allows the formulation or slurry to remain homogeneous since the material does not pass through a liquid stage in the sublimation process which could result in gravitational separation of components. Further since this is performed at low temperatures, there is less danger of curing the constituents.
3. Only small amounts of binder need to be used because large amounts of solvent may be added to the slurry to act as a mixing vehicle. Thus, very low density syntactic foams may be produced.
4. Glass and ceramic forming constituents such as sodium silicate may be used as a binder thereby producing a flame retardant syntactic foam. The resulting foam could essentially be an all glass foam if glass microspheres were to be used.
5. Flame suppressant or retardant powders may be added to the syntactic foam formulation to suppress explosion produced flame. The resultant product would be a syntactic foam containing the flame suppressant powders such as a combination of potassium bicarbonate and urea with a minimum amount of binder content.
6. Low binder content syntactic foams produced by this invention may also be useful in applications involving energy absorption, insulation, buoyancy, etc.

Quartz, glass or other suitable fibers may be used as additional filler materials for added strength.

Typical applications for the syntactic foam product of this invention may include thermal insulation for reentry vehicles and nuclear reactors where low weight thermal stability and structural performance are required.

Materials generally used for making syntactic foams may be used in the practice of this invention. For example, microspheres of such as borosilicate glass having low density, high strength and chemical stability may be combined with suitable resins to make these syntactic foams. Hollow microspheres of resins, such as polystyrene, may also be used. Suitable glass microspheres (wherein the microspheres were hollow) have been employed having a density ranging from 0.20 to 0.37 g./cc.$^3$ as the nominal average particle density.

Bulk density generally is about two thirds of the true particle density. A nominal particle density of 0.35 g./cc.$^3$ would be approximately 0.23 g./cc.$^3$ expressed in bulk density.

The borosilicate glass cited above may have a size between about 20 and about 100 microns. These are the preferred size ranges and the glass microspheres having diameters larger or smaller may also be employed depending upon the application. In instances, hollow microspheres having an inert gas therewithin have been employed in this invention to improve upon flame suppressant and flame retardant properties.

The quantity of glass microspheres used to produce a low binder content syntactic foam which is the subject of this invention may be from about 90 to about 95 w/o and preferably about 95 w/o. The remaining from about 10 to about 5 w/o and preferably about 5 w/o is a mixture of a binder resin, a flexibilizer resin and a curing agent.

Various phenolic, polyester, silicone, or epoxy resins may be used in the practice of this invention. These have also been used in prior art processes for achieving high binder content in syntactic foams. A suggested type of binder resin which is suitable for this process is the liquid glycidyl polyether prepared by reacting epichlorohydrin with 2,2-bis(4-hydroxyphenol)-propane. This resin may adequately hold the glass microspheres or the like together, but, because of the rigidity of the structure, it may be desirable to mix therewith a quantity of epoxy flexibilizer resins such as an aliphatic polyepoxide resin or the like which provide increased flexibility with the above resin. One example of the aliphatic polyepoxide resin is the glycidyl ester of linoleic dimer acid. The epoxy resin (i.e., the epichlorohydrin/2,2-bis(4-hydroxyphenol) propane reaction product epoxy resin) may comprise from about 15 to about 20 w/o of the mixture to be added to the glass microspheres or the like syntactic material, and preferably may comprise about 18 w/o of the material that is to be added. The flexibilizer resin may comprise from about 25 w/o to about 32 w/o and preferably about 32 w/o of the material that is to be added. A suitable curing agent which may be an aromatic amine curing agent for epoxy resins may be used to harden or set the epoxy resins above and may comprise a eutectic mixture of methylenedianiline, p-phenylenediamine and phenylglycidyl ether. This curing agent may comprise from about 10 to about 12 weight percent of the mixture to be added to the glass microspheres and preferably comprises about 12 weight percent. It should be understood that the percentages cited may be varied depending upon the particular system used and the product properties desired.

Using these resins and curing agents, it may be desirable to use or employ a solvent in making a slurry which is easily handled and mixed. Benzene is a nonpolar, acceptable solvent for these resins. This, however, should not restrict the selection of other resins and appropriate curing agents as well as solvents and the use of these will still be within the scope of the invention. Other solvents which may be used are toluene, methanol, ethanol, propanol, iso-propanol, butanol, acetone and methyl ethyl ketone. Using a 100 gram batch composition of glass hollow microspheres, filler material and resin, the solvent additive, such as benzene, may be from about 200 to about 550 milliliters.

In a typical process of this invention, 1.8 grams of the suggested binder resin is mixed with 7.2 grams of a lower viscosity liquid aliphatic polyepoxide resin. The aromatic amine curing agent weighing about 1.1 grams may then be stirred in or mixed in with the resin. Thereafter about 220 milliliters of benzene are added to the mixture while agitating same. Ninety grams of suitable syntactic foam base material or glass microspheres may be added to the mixture while stirring. This may involve a period of from about 3 to 5 minutes in order to avoid breakage of the glass microspheres, but this time is not critical.

If other materials or fillers are desired, such as quartz or glass fibers, or a reaction product of potassium bicarbonate and urea (i.e., a carbamic product), these may now be added. It may be desirable to reduce the amount of glass microspheres which are added in lieu of the weight of the filler material which is to substitute for the glass microspheres, binder resin, flexibilizer resin and curing comprise from about 20 w/o to about 50 w/o of the glass microspheres, binder resin, flexibilizer resin and curing agent weight. This mixture of glass microspheres, filler material if added, resins and curing agent as well as solvent forms a slurry which is poured into a precooled (to about −50° F.) receptacle such as a tray. The slurry is then quickly frozen, for example, in less than about 1 minute. The solvent may then be sublimed from the frozen mixture by placing the frozen mixture in an evacuated and precooled (such as to about −50° F.) sublimation chamber and creating a vapor pressure differential between the frozen product and the condenser. Using the formulation recited above, it may be preferred to have a condenser refrigeration control set to about −60° F. After the sublimation chamber has been evacuated to about or less than 100 microns of mercury, the desired temperature of about −50° F. has been attained, and the desired vapor pressure differential has been achieved, the tray containing the frozen slurry is heated thereby effecting the sublimation of the benzene. The frozen material temperature gradually increases until a predetermined temperature is attained and all the solvent has been sublimed, at which time the mixture is removed from the tray and either placed in a refrigerator at about 40° F. until ready for processing or is immediately loaded into a suitable compression mold and a force of from about 90 to about 200 pounds per square inch and preferably from about 120 to about 140 pounds per square inch is exerted upon the dried product using a suitable press. Pressure is applied to the mold for a period of from about ½ to about 2 minutes or longer as desired. It may be desirable to bring the mixture to about ambient temperature prior to the pressing step. This mold is then cured at a temperature of from about 225° F. to about 255° F. for from about 10 to about 16 hours. After the curing, the syntactic foam may be shaped or machined, using standard machining procedures, to a finished syntactic foam product.

The product of this invention having therein a suitable flame suppressant powder as filler may be used in the production of flame suppressant compacts. These compacts may be used surrounding or in the vicinity of such as emergency destruct devices and their use suppresses explosion caused flames that might present a hazard to personnel operating such devices.

In these compacts which may be used as fire suppressants and retardants and which employ both syntactic foams having a mixture of fire suppressant powders, a low binder content is desirable for two reasons. First, a low strength material is desired and, second, minimization of binder content presents as little as possible combustible material in the compact area.

Table I lists six compositions which were used in flame suppression tests. Table II lists the fireball suppression results obtained with these compositions at varying densities prepared by the process recited herein. It should be noted that the density range feasible for each of these compositions is extensive. The density variation in Table II is from .204 g./cc. to 1.08 g./cc. It should further be noted that the syntactic foam employing glass microspheres having an inert gas within the sphere were successful in suppressing the flame or fireball duration. As the density of the materials not having flame suppressant fillers increases, it may be desired to add flame suppressant as a filler in the syntactic foam for flame suppressant purposes noted in Table II. In compositions E and F, sodium bicarbonate ($NaHCO_3$) is used as the flame suppressant powder. Although the process is suitable for making a compact using flame suppressant powders exclusively and low binder content, as shown in compositions D and F, the low density syntactic foam is achieved by using glass or the like microspheres which artificially create the porous structure.

TABLE I

Composition A:
- Microspheres [1] _____ gms__ 90.0
- Binder Resin [2] _____ gms__ 1.8
- Resin [3] _____ gms__ 7.2
- Curing Agent [4] _____ gms__ 1.1
- Benzene _____ cc__ ~220

Table I—continued

Composition B:
- Microspheres [1] _____ gms__ 90.0
- Binder Resin [2] _____ gms__ .9
- Resin [3] _____ gms__ 3.6
- Curing Agent [4] _____ gms__ .56
- Benzene _____ cc__ ~250

Composition C:
- Microspheres [1] _____ gms__ 90.0
- Powder [5] _____ gms__ 90.0
- Binder Resin [2] _____ gms__ 1.8
- Resin [3] _____ gms__ 7.2
- Curing Agent [4] _____ gms__ 1.1
- Benzene _____ cc__ ~300

Composition D:
- Powder [5] _____ gms__ 500
- Binder Resin [2] _____ gms__ 5
- Resin [3] _____ gms__ 20
- Curing Agent [4] _____ gms__ 3.1
- Benzene _____ cc__ ~300

Composition E:
- Microspheres [1] _____ gms__ 90.0
- $NaHCO_3$ _____ gms__ 90.0
- Binder Resin [2] _____ gms__ 1.8
- Resin [3] _____ gms__ 7.2
- Curing Agent [4] _____ gms__ 1.1
- Benzene _____ cc__ ~300

Composition F:
- $NaHCO_3$ _____ gms__ 500
- Binder Resin [2] _____ gms__ 5.0
- Resin [3] _____ gms__ 20.0
- Curing Agent [4] _____ gms__ 3.1
- Benzene _____ cc__ ~300

[1] Glass hollow microspheres.
[2] Reaction product of epichlorohydrin and 2,2-bis(4-hydroxyphenol)propane.
[3] Aliphatic polyepoxide flexibilizer resin.
[4] Eutectic mixture of p-phenylenediamine, methylenedianiline, and phenylglycidyl ether.
[5] Flame suppressant powder-potassium bicarbonate and urea carbamic reaction product.

TABLE II*

| Density, g./cc. | Fireball duration= frames | Framing rate, FPS** | Weight (grams) |
|---|---|---|---|
| Composition A: | | | |
| .204 | 2 | 3,200 | 15.922 |
| .219 | 2 | 3,200 | 17.904 |
| .238 | 1 | 3,200 | 20.105 |
| .404 | 29 | 3,200 | 6.153 |
| Composition B: | | | |
| .202 | 5 | 3,200 | 16.030 |
| .217 | 5 | 3,200 | 18.069 |
| .234 | 2 | 3,200 | 20.091 |
| Composition C: | | | |
| .292 | 2 | 3,200 | 22.531 |
| .311 | 1 | 3,200 | 24.691 |
| .330 | 1 | 3,200 | 26.795 |
| .331 | 1 | 3,200 | 22.365 |
| .348 | 1 | 3,200 | 29.621 |
| .371 | 2 | 3,200 | 29.541 |
| .472 | 2 | 3,200 | 29.515 |
| Composition D: | | | |
| .771 | 1 | 3,200 | 60.709 |
| .892 | 1 | 3,200 | 78.875 |
| .900 | 1 | 3,200 | 71.210 |
| .962 | 1 | 3,200 | 69.344 |
| .997 | 1 | 3,200 | 69.025 |
| 1.01 | 1 | 3,200 | 80.873 |
| 1.08 | 2 | 3,200 | 36.262 |
| Composition E: | | | |
| .253 | 2 | 4,000 | 20.393 |
| .274 | 2 | 4,000 | 22.578 |
| .297 | 2 | 4,000 | 24.615 |
| .300 | 1 | 3,500 | 24.549 |
| .428 | 1 | 3,500 | 24.043 |
| .499 | 1 | 3,500 | 24.102 |
| Composition F: | | | |
| .689 | 1 | 4,000 | 54.033 |
| .768 | 1 | 4,000 | 60.453 |
| .777 | 1 | 4,000 | 60.711 |
| .808 | 2 | 4,000 | 60.589 |
| .830 | 1 | 4,000 | 60.465 |
| No suppressant | 27 | 3,200 | |

*All specimens=3.18 cm. radius.
**FPS=Frames per second.

It may be desired subsequent to the mixing and prior to the pouring of the slurry, to introduce or cast the slurry into a mold, effecting freeze drying within the mold and subliming the solvent therefrom thereby yielding a cast product which would require no machining or other shaping subsequent to the curing step. This casting procedure may be especially desirable if glass and ceramic forming constituents, such as sodium silicate, are used as a binder thereby forming an essentially all glass flame retardant syntactic foam.

What is claimed is:

1. A process for preparing a low binder content and low density syntactic foam product comprising mixing an epoxy binder resin, a flexibilizer resin and a curing agent to form a first mixture comprising from about 5 to about 10 weight percent of the final product, agitating said first mixture, adding sufficient solvent in a proportion of from about 200 milliliters to about 550 milliliters solvent per 100 grams of said final product to said first mixture during said agitation to provide a highly fluid state second mixture, and, while further agitating, adding hollow microspheres to said second mixture, pouring said second mixture with said hollow microspheres into a precooled receptacle to depth not greater than ½ inch, thereafter freezing said second mixture, subliming said solvent from said second mixture while maintaining said frozen condition, said sublimation yielding a dry product, corpressing said dry product at from about 90 to about 200 pounds per square inch and curing said compressed dry product yielding a syntactic foam product having a density of from about 0.202 to about 0.409 grams per cubic centimeter and a hollow microsphere to resin weight ratio of from about 90 to 10 to about 95 to 5.

2. The process of claim 1 wherein said flexibilizer resin is an aliphatic polyepoxide resin and said solvent is taken from the group consisting of benzene, toluene, methanol, ethanol, propanol, iso-propanol, butanol, acetone, and methyl ethyl ketone.

3. The process of claim 1 wherein said epoxy binder resin is the reaction product of epichlorohydrin and 2,2-bis(4-hydroxyphenol)propane, said flexibilizer resin is the glycidyl ester of linoleic dimer acid, said curing agent is a eutectic mixture of methylenedianiline, p-phenylenediamine, and phenylglycidyl ether, said microspheres are of from about 20 to about 100 micron size and have a density of from about 0.20 to about 0.37 grams per cubic centimeter and said solvent is benzene.

4. The process of claim 3 wherein said precooled receptacle is at about −50° F., said freezing is to about −50° F., and said curing is to from about 225° F. to about 255° F. for from about 10 to about 16 hours.

5. The process of claim 1 wherein said hollow microspheres are glass hollow microspheres.

6. The process of claim 1 further including adding a filler material together with said hollow microspheres, said filler material comprising from about 20 weight percent to about 50 weight percent of said syntactic foam product.

7. The process of claim 6 wherein said syntactic foam has a density of from about 0.202 to about 0.499 grams per cubic centimeter.

8. The process of claim 6 wherein said filler material is taken from the group consisting of quartz and glass fibers and the carbamic reaction product of urea and potassium bicarbonate.

9. The process of claim 1 wherein said compressing is to from about 120 to about 140 pounds.

References Cited
UNITED STATES PATENTS

| | | | |
|---|---|---|---|
| 2,806,509 | 9/1957 | Bozzacco et al. | 260—2.5 EP |
| 3,297,455 | 1/1967 | Ogden | 34—5 |
| 3,281,956 | 11/1966 | Mason | 34—5 |
| 3,057,809 | 10/1962 | Newey | 260—2.5 EP |
| 3,539,474 | 11/1970 | Sommer, Jr. | 260—2.5 EP |
| 2,978,340 | 4/1961 | Veatch et al. | 260—2.5 B |

MORTON FOELAK, Primary Examiner

U.S. Cl. X.R.

34—5, 92; 260—2.5 EP, 2.5 S, 2.5 F, 2.5 N, 18 EP, 23 EP, 23 S, 32.8 SB, 32.8 R, 32.8 EP, 33.4 R, 33.4 EP, 33.4 SB, 33.6 R, 33.6 EP, 33.6 SB, 33.6 EP, 33.6 UA, 42.17, 42.18, 42.26, 42.28, 42.53, 42.54, 45.7 R, 45.9 R, 830 TW, 836, 837 R